United States Patent
Metzger

(10) Patent No.: US 10,642,724 B2
(45) Date of Patent: May 5, 2020

(54) TECHNOLOGIES FOR BRIDGING GAPS IN EXECUTION TRACES

(71) Applicant: Intel IP Corporation, Santa Clara, CA (US)

(72) Inventor: Markus T. Metzger, Ulm (DE)

(73) Assignee: Intel IP Corporation, Santa Clara, CA (US)

( * ) Notice: Subject to any disclaimer, the term of this patent is extended or adjusted under 35 U.S.C. 154(b) by 765 days.

(21) Appl. No.: 15/195,303

(22) Filed: Jun. 28, 2016

(65) Prior Publication Data

US 2017/0371775 A1    Dec. 28, 2017

(51) Int. Cl.
 *G06F 9/44* (2018.01)
 *G06F 11/36* (2006.01)
(52) U.S. Cl.
 CPC ...... *G06F 11/3692* (2013.01); *G06F 11/3636* (2013.01)
(58) Field of Classification Search
 CPC ............. G06F 11/3636; G06F 11/3466; G06F 11/3476; G06F 2201/865; G06F 11/3409
 USPC .................................................. 717/128, 131
 See application file for complete search history.

(56) References Cited

U.S. PATENT DOCUMENTS

2017/0371775 A1* 12/2017 Metzger .............. G06F 11/3636

* cited by examiner

*Primary Examiner* — Chuck O Kendall
(74) *Attorney, Agent, or Firm* — Barnes & Thornburg LLP

(57) ABSTRACT

Technologies for bridging trace gaps include a computing device that traces execution of a program to generate an execution trace and identifies a trace gap in the execution trace. The computing device generates a first call stack that corresponds to a location immediately before the trace gap and a second call stack that corresponds to a location immediately after the trace gap. Each call stack identifies a list of functions, and each function corresponds to a source function of the program. The computing device evaluates connection pairs between the first call stack and the second call stack to determine whether each connection pair is valid and, for each valid connection pair, a number of matching functions. The computing device selects a connection pair that is valid and has a largest number of matching functions and bridges the trace gap with the selected connection pair. Other embodiments are described and claimed.

25 Claims, 6 Drawing Sheets

```
Bridge trace gap:
Input:
  lhs - a function in the call stack of the last
    function before the gap
  rhs - a function in the call stack of the first
    function after the gap
Algorithm:
  do:
    connect lhs to rhs
    lhs = real caller of lhs (ignoring tail calls)
    rhs = real caller of rhs (ignoring tail calls)

if (lhs or rhs does not exist)
       return; // we're done
  loop.
```

```
Connect functions:
Input:
  l - a function
  r - a function
Algorithm:
  l->next = r
  r->prev = l if (l has no caller)
     l->caller = r->caller
  else if (r has no caller)
     r->caller = l->caller
```

FIG. 10

TECHNOLOGIES FOR BRIDGING GAPS IN EXECUTION TRACES

BACKGROUND

Current computing devices may trace the execution of a computer program. Execution trace allows the computing device to reconstruct the sequence of instructions that were executed when the program was traced. Applications such as debuggers may map low-level execution trace data to the statements, functions, and other commands of the traced program. For example, a function call stack or back trace may be generated at a particular point in the execution trace by tracking call and return instructions.

Execution trace data may include gaps between multiple disconnected execution segments. Trace gaps may be caused by, for example, decode errors, trace data losses (e.g., trace hardware overflows), trace filtering (e.g., disabling/enabling tracing), or parallel decode (e.g., splitting the execution trace and decoding in parallel). Trace gaps may make trace analysis difficult or impossible, for example by interfering with correctly detecting functions or generating the call stack.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

FIG. 10 is a pseudocode diagram illustrating a process for bridging a trace gap that may be executed by the computing device of FIGS. 1-2.

DETAILED DESCRIPTION OF THE DRAWINGS

Figure 1:
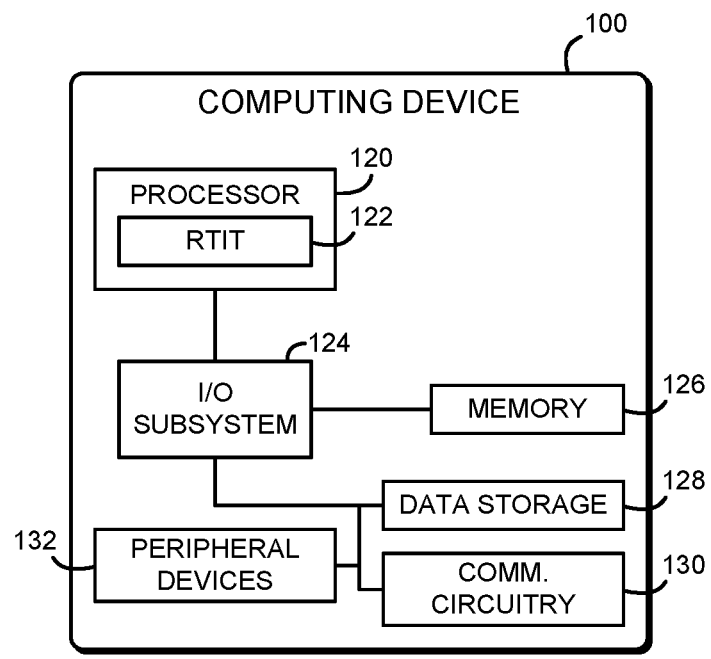
FIG. 1 is a simplified block diagram of at least one embodiment of a computing device for bridging trace gaps.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a computing device 100 for bridging trace gaps in an execution trace includes a processor 120 for executing computer programs. In use, as described further below, the computing device 100 traces execution of a program to generate a trace log, and then identifies a trace gap in the trace log. The computing device 100 generates a call stack for each of the functions immediately before and after the trace gap, and then heuristically selects a consistent, valid connection pair of functions between the call stacks. The computing device 100 bridges the trace gap by connecting functions of the call stacks starting with the selected connection pair. Thus, the computing device 100 may allow improved analysis of a traced program by correcting for trace gaps. The computing device 100 may, for example, correctly identify functions or determine call stacks even in the presence of trace gaps. Additionally, certain trace gaps may be unavoidable (e.g., due to trace hardware overflow), and the computing device 100 may minimize the negative impact of unavoidable trace gaps.

The computing device 100 may be embodied as any type of computation or computer device capable of performing the functions described herein, including, without limitation, a computer, a desktop computer, a workstation, a server, a laptop computer, a notebook computer, a tablet computer, a mobile computing device, a wearable computing device, a network appliance, a web appliance, a distributed computing system, a processor-based system, and/or a consumer electronic device. As shown in FIG. 1, the computing device 100 illustratively includes a processor 120, an input/output subsystem 124, a memory 126, a data storage device 128, and a communication subsystem 130. Of course, the computing device 100 may include other or additional components, such as those commonly found in a desktop computer (e.g., various input/output devices), in other embodiments. Additionally, in some embodiments, one or more of the illustrative components may be incorporated in, or otherwise form a portion of, another component. For example, the memory 126, or portions thereof, may be incorporated in the processor 120 in some embodiments.

The processor 120 may be embodied as any type of processor capable of performing the functions described herein. The processor 120 may be embodied as a single or multi-core processor(s), digital signal processor, microcontroller, or other processor or processing/controlling circuit. In some embodiments, the processor 120 may include real-time instruction tracing (RTIT) support 122. The RTIT support 122 may be embodied as any hardware, microcode, firmware, or other components of the processor 120 capable of generating trace data that may be used to reconstruct the control flow executed by the processor 120. The RTIT support 122 may log data packets relating to whether conditional branches are taken or not taken, target addresses of indirect branch instructions, target addresses of mispredicted return instructions, and other data related to control flow. The trace data, in combination with the in-memory image of the executed program, may be used to reconstruct the control flow executed by the processor 120.

The memory 126 may be embodied as any type of volatile or non-volatile memory or data storage capable of performing the functions described herein. In operation, the memory 126 may store various data and software used during operation of the computing device 100 such as operating systems, applications, programs, libraries, and drivers. The memory 126 is communicatively coupled to the processor 120 via the I/O subsystem 124, which may be embodied as circuitry and/or components to facilitate input/output operations with the processor 120, the memory 126, and other components of the computing device 100. For example, the I/O subsystem 124 may be embodied as, or otherwise include, memory controller hubs, input/output control hubs, platform controller hubs, integrated control circuitry, firmware devices, communication links (i.e., point-to-point links, bus links, wires, cables, light guides, printed circuit board traces, etc.) and/or other components and subsystems to facilitate the input/output operations. In some embodiments, the I/O subsystem 124 may form a portion of a system-on-a-chip (SoC) and be incorporated, along with the processor 120, the memory 126, and other components of the computing device 100, on a single integrated circuit chip.

The data storage device 128 may be embodied as any type of device or devices configured for short-term or long-term storage of data such as, for example, memory devices and circuits, memory cards, hard disk drives, solid-state drives, or other data storage devices. The communication subsystem 130 of the computing device 100 may be embodied as any communication circuit, device, or collection thereof, capable of enabling communications between the computing device 100 and other remote devices over a network. The communication subsystem 130 may be configured to use any one or more communication technology (e.g., wired or wireless communications) and associated protocols (e.g., Ethernet, Bluetooth®, Wi-Fi®, WiMAX, etc.) to effect such communication.

As shown, the computing device 100 may also include one or more peripheral devices 132. The peripheral devices 132 may include any number of additional input/output devices, interface devices, and/or other peripheral devices. For example, in some embodiments, the peripheral devices 132 may include a display, touch screen, graphics circuitry, keyboard, mouse, speaker system, microphone, network interface, and/or other input/output devices, interface devices, and/or peripheral devices.

Figure 2:
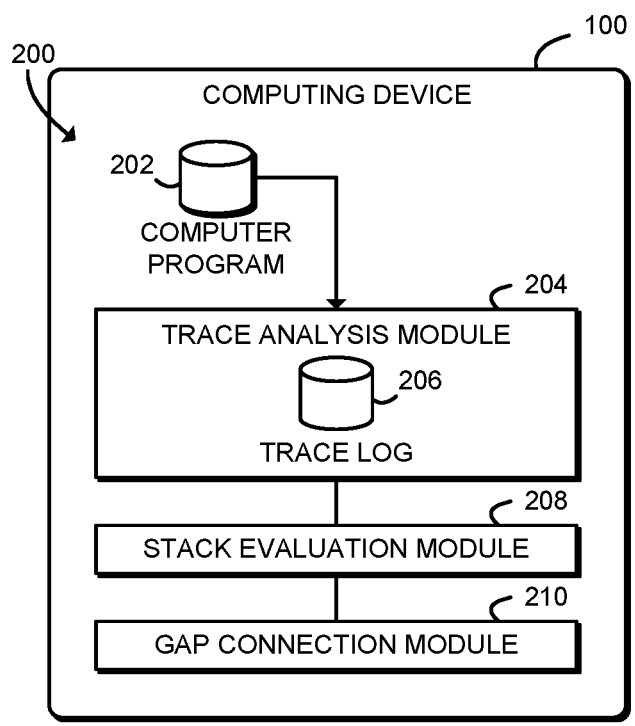
FIG. 2 is a simplified block diagram of at least one embodiment of an environment that may be established by the computing device of FIG. 1.

Referring now to FIG. 2, in an illustrative embodiment, the computing device 100 establishes an environment 200 during operation. The illustrative environment 200 includes a trace analysis module 204, a stack evaluation module 208, and a gap connection module 210. The various modules of the environment 200 may be embodied as hardware, firmware, software, or a combination thereof. As such, in some embodiments, one or more of the modules of the environment 200 may be embodied as circuitry or collection of electrical devices (e.g., trace analysis circuitry 204, stack evaluation circuitry 208, and/or gap connection circuitry 210). It should be appreciated that, in such embodiments, one or more of the trace analysis circuitry 204, the stack evaluation circuitry 208, and/or the gap connection circuitry 210 may form a portion of one or more of the processor 120, the I/O subsystem 124, and/or other components of the computing device 100. Additionally, in some embodiments, one or more of the illustrative modules may form a portion of another module and/or one or more of the illustrative modules may be independent of one another.

The trace analysis module 204 may be configured to trace execution of a computer program 202 to generate an execution trace. The trace analysis module 204 may be configured to trace execution of the program 202 with the RTIT support 122 of the processor 120. The execution trace may be stored in a trace log 206. The trace analysis module 204 may be further configured to identify a trace gap in the execution trace of the program 202. The trace analysis module 204 is configured generate, based on the execution trace of the program 202, a call stack that corresponds to a location immediately before the trace gap in the execution trace. The trace analysis module 204 is further configured to generate a call stack that corresponds to another location immediately after the trace gap in the execution trace. Each call stack identifies a list of functions, and each function corresponds to a source function of the program 202.

The stack evaluation module 208 is configured to evaluate potential connection pairs between the generated call stacks, and to determine whether each connection pair is valid. Each connection pair identifies a pair of functions of the call stacks on either side of the trace gap. Determining whether the connection pair is valid may include determining whether both functions correspond to the same source function of the program 202. The stack evaluation module 208 is further configured to, for each valid connection pair, determine a number of matching functions in the call stacks. The number of matching functions may be determined by determining whether both functions of the connection pair correspond to the same source function, and by recursively comparing the callers of both functions of the connection pair. The stack evaluation module 208 is further configured to select a connection pair that is valid and has the largest number of matching functions of the valid connection pairs.

The gap connection module 210 is configured to bridge the trace gap of the execution trace using the selected connection pair. Bridging the trace gap may include connecting both functions of the selected connection pair and recursively connecting the callers of both functions of the selected connection pair. The gap connection module 210 may be further configured to determine whether a function of the connection pair has no real caller and, if so, to associate that function with a caller of the other function of the connection pair. Recursively connecting the callers of both functions may include recursively connecting the callers after associating that function with the caller of the other function.

Figure 3:
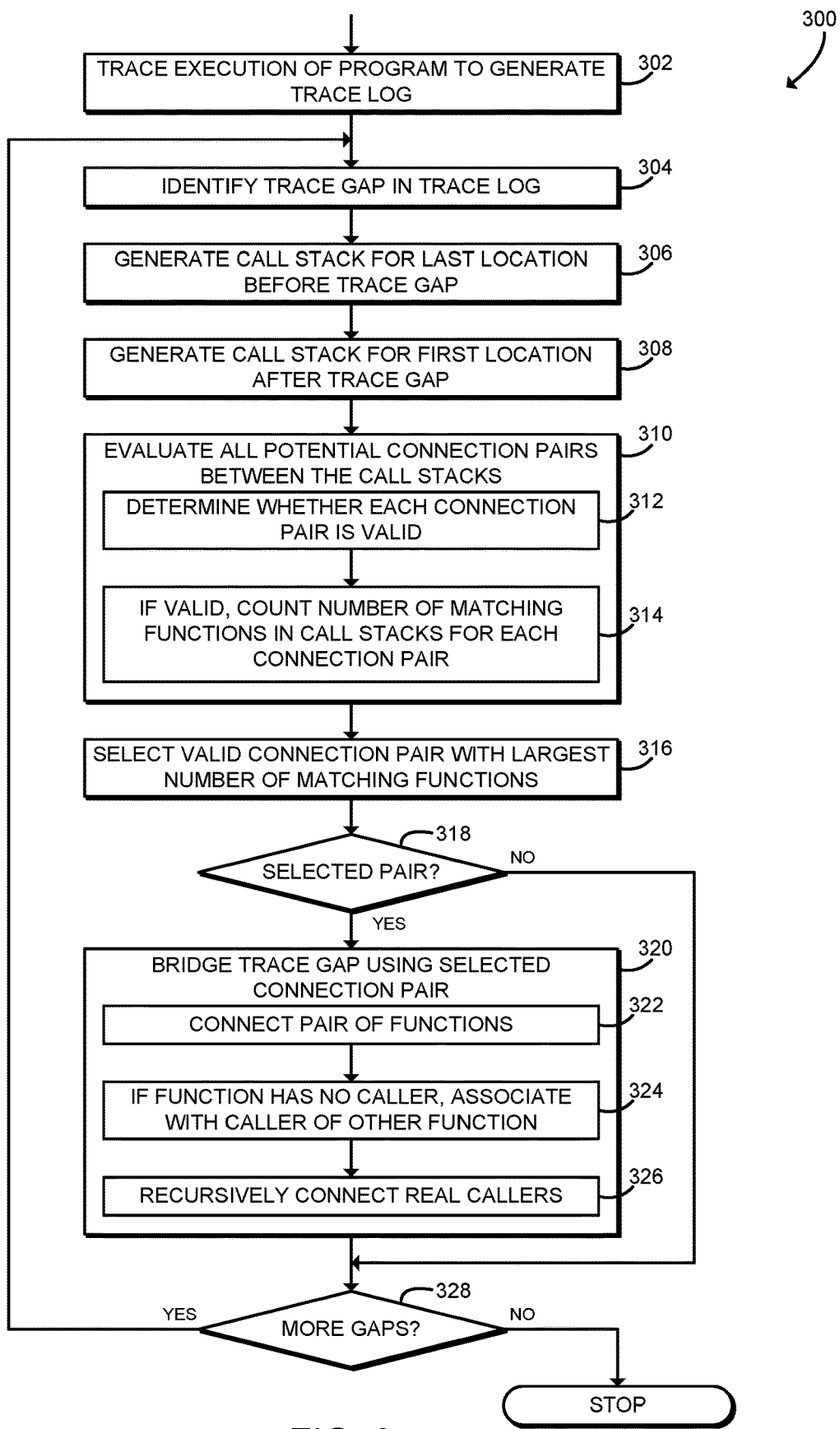
FIG. 3 is a simplified flow diagram of at least one embodiment of a method for bridging trace gaps that may be executed by the computing device of FIGS. 1-2.

Referring now to FIG. 3, in use, the computing device 100 may execute a method 300 for bridging gaps in an execution trace. It should be appreciated that, in some embodiments, the operations of the method 300 may be performed by one or more modules of the environment 200 of the computing device 100 as shown in FIG. 2. The method 300 begins in block 302, in which the computing device 100 traces execution of the computer program 202 to generate the trace log 206. For example, the computing device 100 may trace the program 202 using the RTIT support 122 of the processor 120. During tracing, the trace log 206 may be stored, for example by the data storage device 128, for later analysis. The computing device 100 may continue tracing the program 202 until the program 202 is completed, a breakpoint is reached, a user stops tracing, or any another appropriate event occurs.

In block 304, the computing device 100 identifies a trace gap in the trace log 206. The trace gap may be embodied as any discontinuity in the trace log 206 for which trace data was not recorded. Thus, the trace gap may be identified by a pair of locations in the traced program 202 occurring immediately before and immediately after the trace gap. For example, a trace gap may occur when one or more trace data packets are lost during execution as a result of hardware overflow in the RTIT support 122, losses while copying trace data to the data storage device 128, or other losses. As another example, a trace gap may occur due to decode errors that cause the computing device 100 to disregard certain parts of the trace log 206, or due to filtering in which certain parts of the execution of the program 202 were intentionally not traced. In some embodiments, the computing device 100 may analyze only a partial trace log 206, for example when splitting the trace log 206 and performing parallel decode, which may also result in trace gaps in the partial trace log 206.

In block 306, the computing device 100 generates a call stack for the last location in the execution trace before the trace gap. The call stack identifies a list of functions from the execution trace that had been called immediately before the trace gap. Each function in the call stack corresponds to a source function in the program 202. The top of the call stack identifies the deepest function call level. That is, the top of the call stack identifies the function that was executing immediately before the trace gap, the next function of the call stack identifies the caller of the currently executing function, and so on to the bottom of the call stack. The bottom of the call stack may identify the outermost function that had been called immediately before the trace gap, for example an initial function such as a main( ) function. In some embodiments, the call stack may match the control flow executed by the processor 120 of the computing device 100 and thus may omit tail calls, for example due to optimization during compilation of the program 202. Additionally or alternatively, in some embodiments the call stack may be modified to match source code for the program 202, for example by inserting functions in the call stack corresponding to tail calls. In block 308, the computing device 100 generates a call stack for the first location in the execution trace after the trace gap. That call stack similarly identifies a list of functions that had been called immediately after the trace gap, with each function corresponding to a source function of the program 202.

Figure 4:
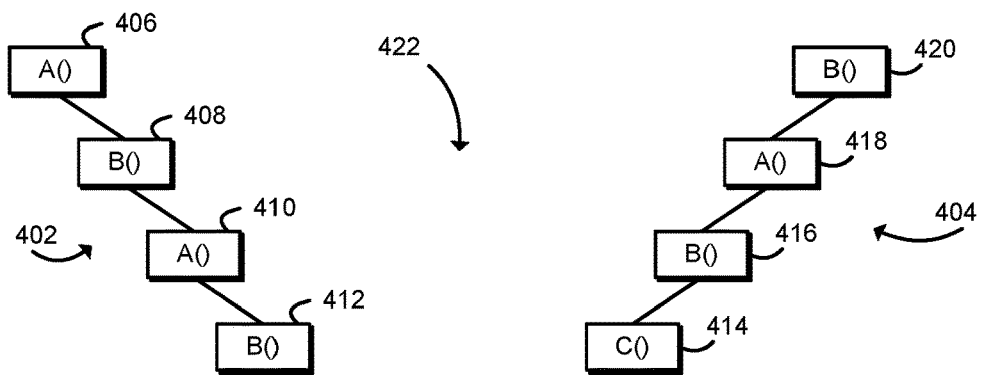
FIG. 4 is a schematic diagram illustrating call stacks that may be generated from a program trace by the computing device of FIGS. 1-2.

Referring now to FIG. 4, a diagram 400 illustrates two call stacks 402, 404 that may be generated by the computing device 100. As shown, the call stack 402 includes four functions 406, 408, 410, 412. The function 412 is at the top of the call stack 402, and corresponds to a source function B( ) in the computer program 202. The next function in the call stack 402 is the function 410, which corresponds to a source function A( ). Thus, the call stack 402 indicates that the function 412 is the currently executing function, and the function 410 is the caller of the function 412. Similarly, the function 408 is the caller of the function 410, and the function 406 is the caller of the function 408.

The call stack 404 also includes four functions 414, 416, 418, 420. The function 414 is at the top of the call stack 404, and corresponds to a source function C( ) in the computer program 202. The next function in the call stack 404 is the function 416, which corresponds to the source function B( ). Thus, the call stack 404 indicates that the function 414 is the currently executing function, and the function 416 is the caller of the function 414. Similarly, the function 418 is the caller of the function 416, and the function 420 is the caller of the function 418. As shown, each of the call stacks 402, 404 may be separated by a trace gap 422, which is a discontinuity in the execution trace.

Referring back to FIG. 3, in block 310, the computing device 100 evaluates all potential connection pairs between the call stacks on either side of the trace gap. Each connection pair identifies two functions: one function from the call stack before the trace gap and another function from the call stack after the trace gap. The computing device 100 determines whether each connection pair is valid and, from the valid connection pairs, selects a connection pair to connect. To evaluate the potential connections, the computing device 100 may iterate through all potential pairings of functions in the call stacks and perform the operations of blocks 312, 314.

In block 312, the computing device 100 determines whether each connection pair is valid. A connection pair is valid if both of the functions of the connection pair correspond to the same source function in the program 202, and if any callers of the connection pair are similarly valid. For example, to determine whether a connection pair is valid, the computing device 100 may determine whether the source function corresponding to the function from the call stack before the trace gap matches the source function corresponding to the function from the call stack after the trace gap. If the source functions match, the computing device 100 may determine whether the callers of each of those functions also correspond to a matching source function and continue to determine whether callers are valid to the bottom of the call stacks. The computing device 100 may stop iterating through the call stacks when no caller is found for a function (i.e., when the bottom of one of the call stacks is reached).

In block 314, if a connection pair is valid, the computing device 100 counts the number of matching functions in the call stacks, starting at the valid connection pair. As described above in connection with block 312, the computing device 100 may iterate through the call stacks toward the bottom of the call stacks, comparing the source functions corresponding to each pair of functions. If a pair of functions matches, the computing device 100 may increment a count of matching functions. If a pair of functions does not match (i.e., if each call stack refers to a different source function in the program 202), the computing device 100 may determine that the initial connection pair is invalid.

After finding valid connection pairs and determining the number of matching functions for each valid connection pair, in block 316 the computing device 100 may select a valid connection pair with the largest number of matching functions. As described further below, the selected connection pair may be connected to bridge the trace gap. Of course, if no connection pairs are valid, the computing device 100 may select no connection pair (e.g., a null value).

Figure 5:
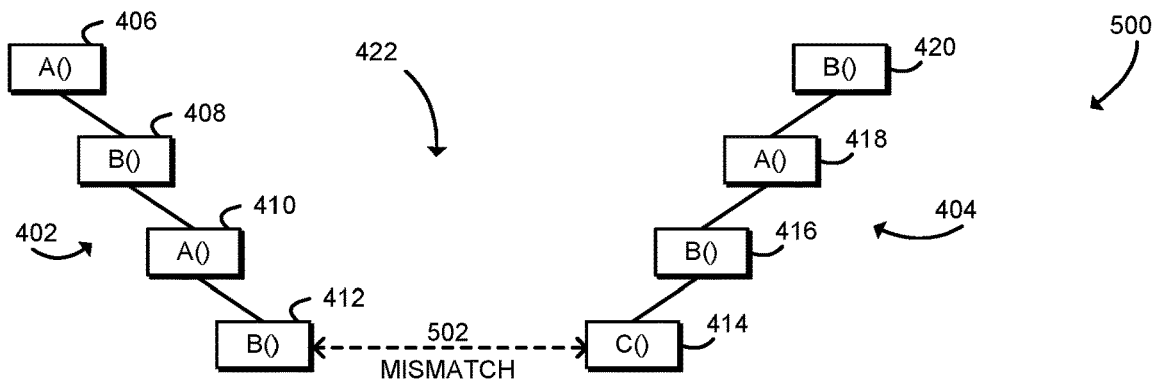
FIG. 5 is a schematic diagram illustrating an invalid connection pair of the call stacks of FIG. 4.

Referring now to FIG. 5, diagram 500 illustrates the call stacks 402, 404 on either side of the trace gap 422. As shown in FIG. 5, a connection pair 502 between the function 412 and the function 414 may be evaluated. The connection pair 502 is invalid because the function 412 corresponds to the source function B( ) and the function 414 corresponds to the source function C( ), and those source functions do not match. Thus, the connection pair 502 is invalid and may be disregarded.

Figure 6:
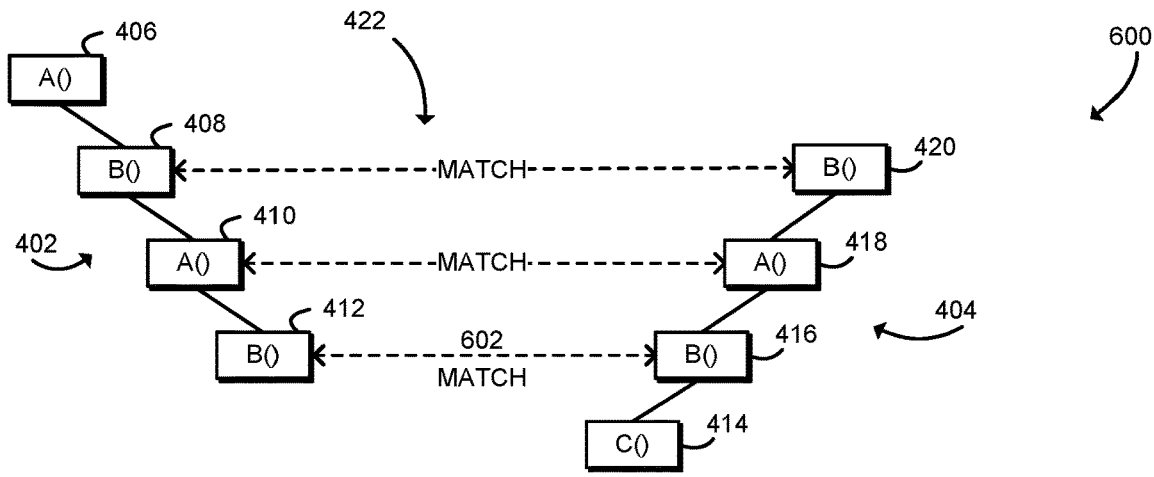
FIG. 6 is a schematic diagram illustrating a valid connection pair of the call stacks of FIG. 4.

Referring now to FIG. 6, diagram 600 illustrates the call stacks 402, 404 on either side of the trace gap 422. As shown in FIG. 6, a connection pair 602 between the function 412 and the function 416 may be evaluated. The function 412 and the function 416 both correspond to the source function B( ). The function 410, which is the caller of the function 412, and the function 418, which is the caller of the function 416, both correspond to the source function A( ). The function 408, which is the caller of the function 410, and the function 420, which is the caller of the function 418, both correspond to the source function BU. The function 420 is at the bottom of the call stack 404. Thus, the connection pair 602 is valid because the functions 412, 416 and their callers match. As shown in FIG. 6, there are three matching functions for the connection pair 602.

Figure 7:
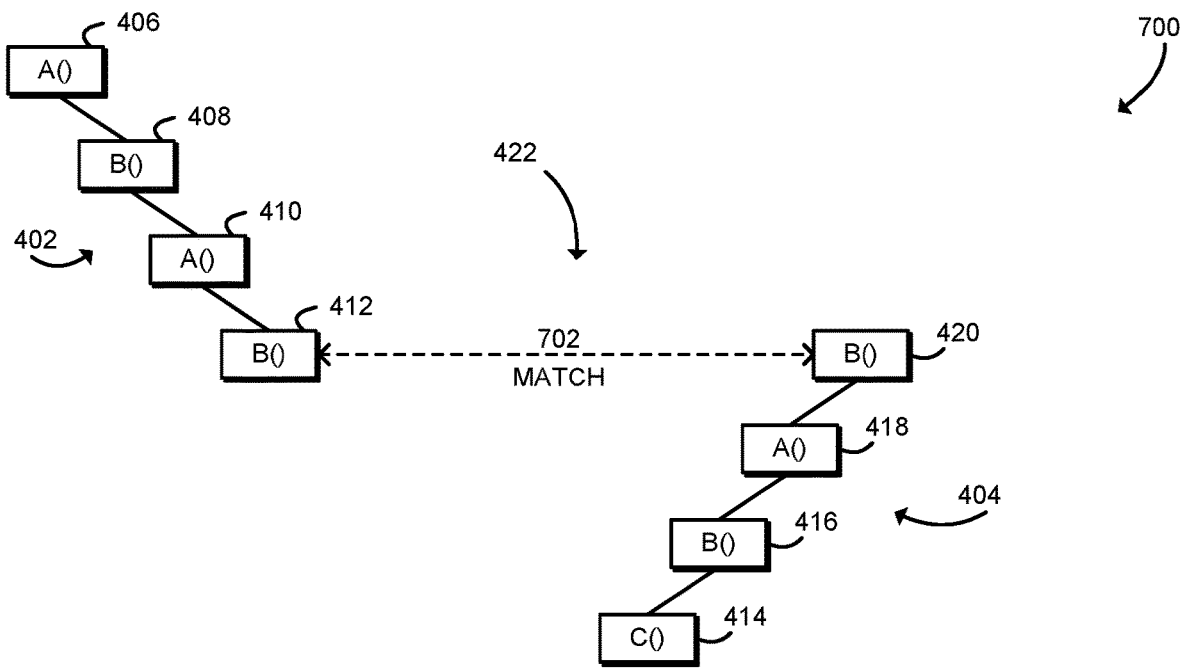
FIG. 7 is a schematic diagram illustrating another valid connection pair of the call stacks of FIG. 4.

Referring now to FIG. 7, diagram 700 illustrates the call stacks 402, 404 on either side of the trace gap 422. As shown in FIG. 7, a connection pair 702 between the function 412 and the function 420 may be evaluated. The function 412 and the function 420 both correspond to the source function B( ). The function 420 is at the bottom of the call stack 404. Thus, the connection pair 702 is valid because the functions 412, 420 and their callers match. As shown in FIG. 7, there is only one matching function for the connection pair 702. Thus, because the connection pair 602 has three matching functions and the connection pair 702 has only one matching function, in the illustrative example the computing device 100 may select the connection pair 602 to use when bridging the trace gap 422.

Referring back to FIG. 3, after evaluating the connection pairs and potentially selecting a connection pair with the largest number of matching functions, in block 318 the computing device 100 determines whether a connection pair was selected. If not (i.e., if no potential connection pairs are valid), the method 300 branches ahead to block 328, described below. If a connection pair was selected, the method 300 advances to block 320.

In block 320, the computing device 100 bridges the trace gap in the instruction trace based on the selected connection pair. To bridge the trace gap, the computing device 100 connects functions from the call stacks on either side of the trace gap starting at the selected connection pair and iterates toward the bottom of the call stacks. The computing device 100 may also extend the call stacks by associating functions with callers from the other side of the trace gap. To bridge the gap, the computing device 100 may perform the operations of blocks 322, 324, 326 starting with the selected connection pair. In block 322, the computing device 100 connects the pair of functions referenced by the selected connection pair. The connected functions represent functions on either side of the trace gap that the computing device 100 has determined are likely to be at the same call depth level. In block 324, if one of the connected functions has no real caller (ignoring tail calls), the computing device 100 associates that function with the caller of the other function. For example, the computing device 100 may determine whether each of the functions has a caller in the corresponding call stack. The computing device 100 may disregard functions in a call stack that correspond to a tail call, or in some embodiments the calls stacks may not include tail calls.

In block 326, the computing device 100 recursively connects the real callers of the connected functions. To recursively connect the real callers, the computing device 100 may repeat the operations of blocks 322, 324, 326 for the pair of functions represented by the real callers. By recursively connecting the callers in block 326 after potentially associating a function with a caller from the other side of the trace gap as described in block 324, the computing device 100 may allow the call stacks to be extended to the same depth on both sides of the trace gap.

In block 328, the computing device 100 determines whether additional trace gaps exist in the trace log 206. If so, the method 300 loops back to block 304 to continue analyzing and bridging the trace gaps. If no further trace gaps exist in the trace log 206, the method 300 is completed. The computing device 100 may allow a user to analyze or otherwise review the instruction trace, including the connected call stacks on either side of each trace gap. The computing device 100 may execute the method 300 again to repeat the analysis and/or to analyze another computer program 202.

Figure 8:
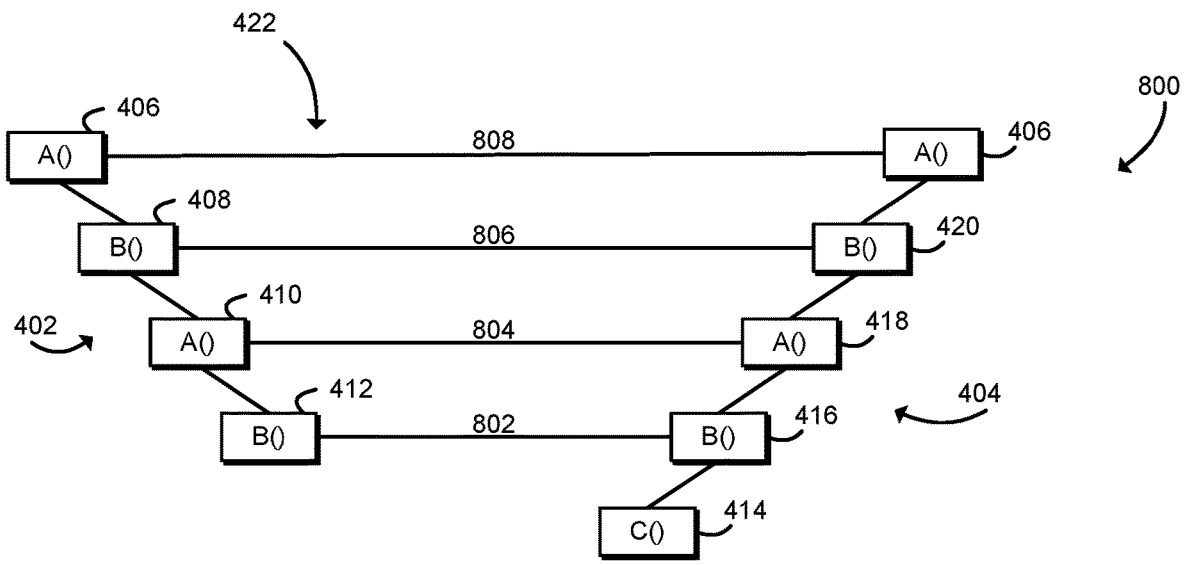
FIG. 8 is a schematic diagram illustrating the call stacks of FIG. 4 after bridging a trace gap.

Referring now to FIG. 8, diagram 800 illustrates the call stacks 402, 404 after bridging the trace gap 422. As described above in connection with FIGS. 5-7, the computing device 100 may begin bridging the trace gap 422 starting with the connection pair 602, which has the largest number of matching functions. As shown, a connection 802 may be established between the functions 412, 416, a connection 804 may be established between the functions 410, 418, and a connection 806 may be established between the functions 408, 420. As shown in FIG. 5-7, the function 420 may initially be at the bottom of the call stack 404 and thus may have no caller. Thus, the computing device 100 may assign the caller of the function 408 (i.e., the function 406) to be the caller of the function 420. After assigning the function 406 as the caller of the function 420, a connection 808 may be established between the functions 406 in the call stacks 402, 404.

Figure 9:
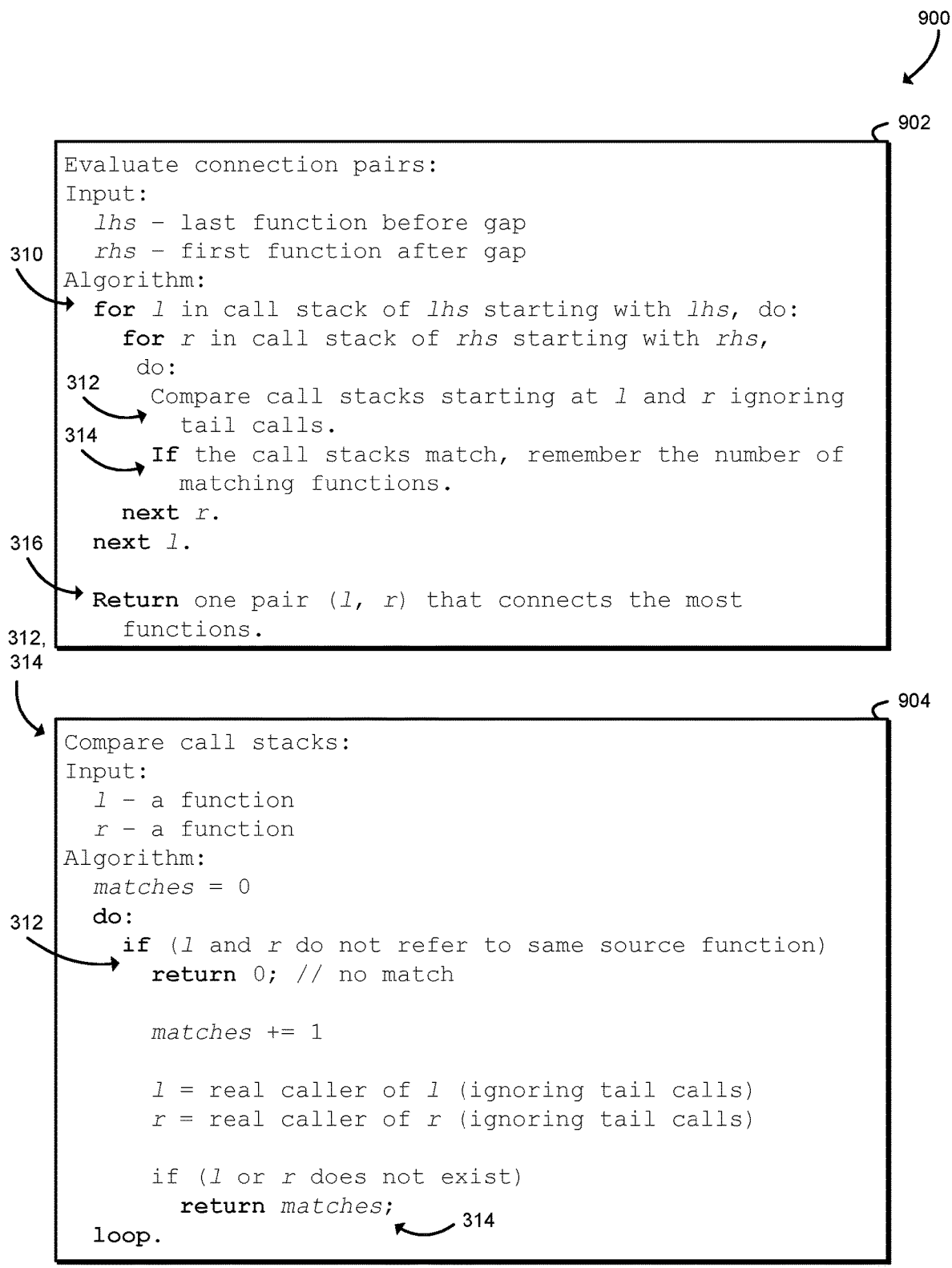
FIG. 9 is a pseudocode diagram illustrating a process for evaluating connection pairs that may be executed by the computing device of FIGS. 1-2.

Referring now to FIG. 9, pseudocode diagram 900 illustrates one potential embodiment of a method for evaluating connection pairs that may be executed by the computing device 100. Pseudocode 902 illustrates a function for evaluating connection pairs and returning a connection pair having the most matching functions. As shown, the pseudocode 902 may correspond to the operations of blocks 310, 316 as described above in connection with FIG. 3. Pseudocode 904 illustrates a function for comparing call stacks that may be invoked by the pseudocode 902. As shown, the pseudocode 904 may correspond to the operations of blocks 312, 314 as described above in connection with FIG. 3.

Referring now to FIG. 10, pseudocode diagram 1000 illustrates one potential embodiment of a method for bridging a trace gap that may be executed by the computing device 100. Pseudocode 1002 illustrates a function for bridging the trace gap. As shown, the pseudocode 1002 may correspond to the operations of block 320 as described above in connection with FIG. 3. Pseudocode 1004 illustrates a function for connecting functions that may be invoked by the pseudocode 1002. As shown, the pseudocode 1004 may correspond to the operations of blocks 322, 324 as described above in connection with FIG. 3.

It should be appreciated that, in some embodiments, the method 300 may be embodied as various instructions stored on a computer-readable media, which may be executed by the processor 120 and/or other components of the computing device 100 to cause the computing device 100 to perform the method 300. The computer-readable media may be embodied as any type of media capable of being read by the computing device 100 including, but not limited to, the memory 126, the data storage device 128, firmware devices, other memory or data storage devices of the computing device 100, portable media readable by a peripheral device 132 of the computing device 100, and/or other media.

EXAMPLES

Illustrative examples of the technologies disclosed herein are provided below. An embodiment of the technologies may include any one or more, and any combination of, the examples described below.

Example 1 includes a computing device for program trace analysis, the computing device comprising: a trace analysis module to generate, based on an execution trace of a program, a first call stack that corresponds to a first location immediately before a trace gap in the execution trace and a second call stack that corresponds to a second location immediately after the trace gap, wherein the first call stack identifies a first list of functions and the second call stack identifies a second list of functions, and wherein each function corresponds to a source function of the program; a stack evaluation module to (i) evaluate potential connection pairs between the first call stack and the second call stack to determine whether each connection pair is valid and, for each valid connection pair, a number of matching functions, wherein each connection pair identifies a first function of the first call stack and a second function of the second call stack, and (ii) select a first connection pair that is valid and has a largest number of matching functions of the valid connection pairs; and a gap connection module to bridge the trace gap of the execution trace with the first connection pair.

Example 2 includes the subject matter of Example 1, and wherein to evaluate the potential connection pairs comprises to determine whether the first function of a connection pair and the second function of the connection pair correspond to the same source function of the program.

Example 3 includes the subject matter of any of Examples 1 and 2, and wherein to evaluate the potential connection pairs further comprises to increment the number of matching functions for the connection pair in response to a determination that the first function and the second function correspond to the same source function.

Example 4 includes the subject matter of any of Examples 1-3, and wherein to evaluate the potential connection pairs further comprises to recursively determine whether a first caller of the first function and a second caller of the second function correspond to the same source function of the program.

Example 5 includes the subject matter of any of Examples 1-4, and wherein to evaluate the potential connection pairs further comprises to increment the number of matching functions for the connection pair in response to a determination that the first caller and the second caller correspond to the same source function.

Example 6 includes the subject matter of any of Examples 1-5, and wherein to evaluate the potential connection pairs comprises to ignore tail calls in the first call stack and the second call stack.

Example 7 includes the subject matter of any of Examples 1-6, and wherein to bridge the trace gap comprises to: connect the first function of the first connection pair to the second function of the first connection pair; and recursively connect a first caller of the first function to a second caller of the second function.

Example 8 includes the subject matter of any of Examples 1-7, and wherein to bridge the trace gap further comprises to: determine whether the first function or the second function has no real caller; associate the first function with a caller of the second function in response to a determination that the first function has no real caller; and associate the second function with a caller of the first function in response to a determination that the second function has no real caller; wherein to recursively connect the first caller to the second caller comprises to recursively connect the first caller to the second caller in response to an association of the first function with the caller of the second function or an association of the second function with the caller of the first function.

Example 9 includes the subject matter of any of Examples 1-8, and wherein to recursively connect the first caller to the second caller comprises to: identify the first caller of the first function of the pair of functions, wherein the first caller is not a tail caller; identify the second caller of the second function of the pair of functions, wherein the second caller is not a tail caller; and recursively connect the first caller and the second caller in response to identification of the first caller and identification of the second caller.

Example 10 includes the subject matter of any of Examples 1-9, and wherein to bridge the trace gap further comprises to add one or more tail callers of the first function to a call stack of the second function.

Example 11 includes the subject matter of any of Examples 1-10, and wherein the trace analysis module is further to trace execution of the program to generate the execution trace.

Example 12 includes the subject matter of any of Examples 1-11, and wherein to trace execution of the program comprises to trace execution of the program with execution trace support of a processor of the computing device.

Example 13 includes the subject matter of any of Examples 1-12, and wherein the trace analysis module is further to identify the trace gap in the execution trace of the program in response to tracing of the execution of the program.

Example 14 includes a method for program trace analysis, the method comprising: generating, by a computing device, based on an execution trace of a program, a first call stack corresponding to a first location immediately before a trace gap in the execution trace and a second call stack corresponding to a second location immediately after the trace gap, wherein the first call stack identifies a first list of functions and the second call stack identifies a second list of functions, and wherein each function corresponds to a source function of the program; evaluating, by the computing device, potential connection pairs between the first call stack and the second call stack to determine whether each connection pair is valid and, for each valid connection pair, a number of matching functions, wherein each connection pair identifies a first function of the first call stack and a second function of the second call stack; selecting, by the computing device, a first connection pair that is valid and has a largest number of matching functions of the valid connection pairs; and bridging, by the computing device, the trace gap of the execution trace using the first connection pair.

Example 15 includes the subject matter of Example 14, and wherein evaluating the potential connection pairs comprises determining whether the first function of a connection pair and the second function of the connection pair correspond to the same source function of the program.

Example 16 includes the subject matter of any of Examples 14 and 15, and wherein evaluating the potential connection pairs further comprises incrementing the number of matching functions for the connection pair in response to determining that the first function and the second function correspond to the same source function.

Example 17 includes the subject matter of any of Examples 14-16, and wherein evaluating the potential connection pairs further comprises recursively determining whether a first caller of the first function and a second caller of the second function correspond to the same source function of the program.

Example 18 includes the subject matter of any of Examples 14-17, and wherein evaluating the potential connection pairs further comprises incrementing the number of matching functions for the connection pair in response to determining that the first caller and the second caller correspond to the same source function.

Example 19 includes the subject matter of any of Examples 14-18, and wherein evaluating the potential connection pairs comprises ignoring tail calls in the first call stack and the second call stack.

Example 20 includes the subject matter of any of Examples 14-19, and wherein bridging the trace gap comprises: connecting the first function of the first connection pair to the second function of the first connection pair; and recursively connecting a first caller of the first function to a second caller of the second function.

Example 21 includes the subject matter of any of Examples 14-20, and wherein bridging the trace gap further comprises: determining whether the first function or the second function has no real caller; associating the first function with a caller of the second function in response to determining that the first function has no real caller; and associating the second function with a caller of the first function in response to determining that the second function has no real caller; wherein recursively connecting the first caller to the second caller comprises recursively connecting the first caller to the second caller in response to associating the first function with the caller of the second function or associating the second function with the caller of the first function.

Example 22 includes the subject matter of any of Examples 14-21, and wherein recursively connecting the first caller to the second caller comprises: identifying the first caller of the first function of the pair of functions, wherein the first caller is not a tail caller; identifying the second caller of the second function of the pair of functions, wherein the second caller is not a tail caller; and recursively connecting the first caller and the second caller in response to identifying the first caller and identifying the second caller.

Example 23 includes the subject matter of any of Examples 14-22, and wherein bridging the trace gap further comprises adding one or more tail callers of the first function to a call stack of the second function.

Example 24 includes the subject matter of any of Examples 14-23, and further comprising tracing, by the computing device, execution of the program to generate the execution trace.

Example 25 includes the subject matter of any of Examples 14-24, and wherein tracing execution of the program comprises tracing execution of the program using execution trace support of a processor of the computing device.

Example 26 includes the subject matter of any of Examples 14-25, and further comprising identifying, by the computing device, the trace gap in the execution trace of the program in response to tracing the execution of the program.

Example 27 includes a computing device comprising: a processor; and a memory having stored therein a plurality of instructions that when executed by the processor cause the computing device to perform the method of any of Examples 14-26.

Example 28 includes one or more machine readable storage media comprising a plurality of instructions stored thereon that in response to being executed result in a computing device performing the method of any of Examples 14-26.

Example 29 includes a computing device comprising means for performing the method of any of Examples 14-26.

Example 30 includes a computing device for program trace analysis, the computing device comprising: means for generating, based on an execution trace of a program, a first call stack corresponding to a first location immediately before a trace gap in the execution trace and a second call stack corresponding to a second location immediately after the trace gap, wherein the first call stack identifies a first list of functions and the second call stack identifies a second list of functions, and wherein each function corresponds to a source function of the program; means for evaluating potential connection pairs between the first call stack and the second call stack to determine whether each connection pair is valid and, for each valid connection pair, a number of matching functions, wherein each connection pair identifies a first function of the first call stack and a second function of the second call stack; means for selecting a first connection pair that is valid and has a largest number of matching functions of the valid connection pairs; and means for bridging the trace gap of the execution trace using the first connection pair.

Example 31 includes the subject matter of Example 30, and wherein the means for evaluating the potential connection pairs comprises means for determining whether the first function of a connection pair and the second function of the connection pair correspond to the same source function of the program.

Example 32 includes the subject matter of any of Examples 30 and 31, and wherein the means for evaluating the potential connection pairs further comprises means for incrementing the number of matching functions for the connection pair in response to determining that the first function and the second function correspond to the same source function.

Example 33 includes the subject matter of any of Examples 30-32, and wherein the means for evaluating the potential connection pairs further comprises means for recursively determining whether a first caller of the first function and a second caller of the second function correspond to the same source function of the program.

Example 34 includes the subject matter of any of Examples 30-33, and wherein the means for evaluating the potential connection pairs further comprises means for incrementing the number of matching functions for the connection pair in response to determining that the first caller and the second caller correspond to the same source function.

Example 35 includes the subject matter of any of Examples 30-34, and wherein the means for evaluating the potential connection pairs comprises means for ignoring tail calls in the first call stack and the second call stack.

Example 36 includes the subject matter of any of Examples 30-35, and wherein the means for bridging the trace gap comprises: means for connecting the first function of the first connection pair to the second function of the first connection pair; and means for recursively connecting a first caller of the first function to a second caller of the second function.

Example 37 includes the subject matter of any of Examples 30-36, and wherein the means for bridging the trace gap further comprises: means for determining whether the first function or the second function has no real caller; means for associating the first function with a caller of the second function in response to determining that the first function has no real caller; and means for associating the second function with a caller of the first function in response to determining that the second function has no real caller; wherein the means for recursively connecting the first caller to the second caller comprises means for recursively connecting the first caller to the second caller in response to associating the first function with the caller of the second function or associating the second function with the caller of the first function.

Example 38 includes the subject matter of any of Examples 30-37, and wherein the means for recursively connecting the first caller to the second caller comprises: means for identifying the first caller of the first function of the pair of functions, wherein the first caller is not a tail caller; means for identifying the second caller of the second function of the pair of functions, wherein the second caller is not a tail caller; and means for recursively connecting the first caller and the second caller in response to identifying the first caller and identifying the second caller.

Example 39 includes the subject matter of any of Examples 30-38, and wherein the means for bridging the trace gap further comprises means for adding one or more tail callers of the first function to a call stack of the second function.

Example 40 includes the subject matter of any of Examples 30-39, and further comprising means for tracing execution of the program to generate the execution trace.

Example 41 includes the subject matter of any of Examples 30-40, and wherein the means for tracing execution of the program comprises means for tracing execution of the program using execution trace support of a processor of the computing device.

Example 42 includes the subject matter of any of Examples 30-41, and further comprising means for identifying the trace gap in the execution trace of the program in response to tracing the execution of the program.

The invention claimed is:

1. A computing device for program trace analysis, the computing device comprising:
a trace analysis module to generate, based on an execution trace of a program, a first call stack that corresponds to a first location immediately before a trace gap in the execution trace and a second call stack that corresponds to a second location immediately after the trace gap, wherein the first call stack identifies a first list of functions and the second call stack identifies a second list of functions, and wherein each function corresponds to a source function of the program;
a stack evaluation module to (i) evaluate potential connection pairs between the first call stack and the second call stack to determine whether each connection pair is valid and, for each valid connection pair, a number of matching functions, wherein each connection pair identifies a first function of the first call stack and a second function of the second call stack, and (ii) select a first connection pair that is valid and has a largest number of matching functions of the valid connection pairs; and
a gap connection module to bridge the trace gap of the execution trace with the first connection pair.

2. The computing device of claim 1, wherein to evaluate the potential connection pairs comprises to:
determine whether the first function of a connection pair and the second function of the connection pair correspond to the same source function of the program; and
increment the number of matching functions for the connection pair in response to a determination that the first function and the second function correspond to the same source function.

3. The computing device of claim 2, wherein to evaluate the potential connection pairs further comprises to:
recursively determine whether a first caller of the first function and a second caller of the second function correspond to the same source function of the program; and
increment the number of matching functions for the connection pair in response to a determination that the first caller and the second caller correspond to the same source function.

4. The computing device of claim 1, wherein to evaluate the potential connection pairs comprises to ignore tail calls in the first call stack and the second call stack.

5. The computing device of claim 1, wherein to bridge the trace gap comprises to:
connect the first function of the first connection pair to the second function of the first connection pair; and
recursively connect a first caller of the first function to a second caller of the second function.

6. The computing device of claim 5, wherein to bridge the trace gap further comprises to:
determine whether the first function or the second function has no real caller;
associate the first function with a caller of the second function in response to a determination that the first function has no real caller; and
associate the second function with a caller of the first function in response to a determination that the second function has no real caller;
wherein to recursively connect the first caller to the second caller comprises to recursively connect the first caller to the second caller in response to an association of the first function with the caller of the second function or an association of the second function with the caller of the first function.

7. The computing device of claim 5, wherein to recursively connect the first caller to the second caller comprises to:

identify the first caller of the first function of the pair of functions, wherein the first caller is not a tail caller;

identify the second caller of the second function of the pair of functions, wherein the second caller is not a tail caller; and recursively connect the first caller and the second caller in response to identification of the first caller and identification of the second caller.

8. The computing device of claim 5, wherein to bridge the trace gap further comprises to add one or more tail callers of the first function to a call stack of the second function.

9. The computing device of claim 1, wherein the trace analysis module is further to trace execution of the program to generate the execution trace.

10. The computing device of claim 9, wherein to trace execution of the program comprises to trace execution of the program with execution trace support of a processor of the computing device.

11. The computing device of claim 9, wherein the trace analysis module is further to identify the trace gap in the execution trace of the program in response to tracing of the execution of the program.

12. A method for program trace analysis, the method comprising:

generating, by a computing device, based on an execution trace of a program, a first call stack corresponding to a first location immediately before a trace gap in the execution trace and a second call stack corresponding to a second location immediately after the trace gap, wherein the first call stack identifies a first list of functions and the second call stack identifies a second list of functions, and wherein each function corresponds to a source function of the program;

evaluating, by the computing device, potential connection pairs between the first call stack and the second call stack to determine whether each connection pair is valid and, for each valid connection pair, a number of matching functions, wherein each connection pair identifies a first function of the first call stack and a second function of the second call stack;

selecting, by the computing device, a first connection pair that is valid and has a largest number of matching functions of the valid connection pairs; and bridging, by the computing device, the trace gap of the execution trace using the first connection pair.

13. The method of claim 12, wherein evaluating the potential connection pairs comprises:

determining whether the first function of a connection pair and the second function of the connection pair correspond to the same source function of the program; and incrementing the number of matching functions for the connection pair in response to determining that the first function and the second function correspond to the same source function.

14. The method of claim 13, wherein evaluating the potential connection pairs further comprises:

recursively determining whether a first caller of the first function and a second caller of the second function correspond to the same source function of the program; and incrementing the number of matching functions for the connection pair in response to determining that the first caller and the second caller correspond to the same source function.

15. The method of claim 12, wherein bridging the trace gap comprises:

connecting the first function of the first connection pair to the second function of the first connection pair; and recursively connecting a first caller of the first function to a second caller of the second function.

16. The method of claim 15, wherein bridging the trace gap further comprises:

determining whether the first function or the second function has no real caller;

associating the first function with a caller of the second function in response to determining that the first function has no real caller; and associating the second function with a caller of the first function in response to determining that the second function has no real caller;

wherein recursively connecting the first caller to the second caller comprises recursively connecting the first caller to the second caller in response to associating the first function with the caller of the second function or associating the second function with the caller of the first function.

17. The method of claim 12, further comprising tracing, by the computing device, execution of the program to generate the execution trace.

18. The method of claim 17, further comprising identifying, by the computing device, the trace gap in the execution trace of the program in response to tracing the execution of the program.

19. One or more non-transitory, computer-readable storage media comprising a plurality of instructions that in response to being executed cause a computing device to:

generate, based on an execution trace of a program, a first call stack corresponding to a first location immediately before a trace gap in the execution trace and a second call stack corresponding to a second location immediately after the trace gap, wherein the first call stack identifies a first list of functions and the second call stack identifies a second list of functions, and wherein each function corresponds to a source function of the program;

evaluate potential connection pairs between the first call stack and the second call stack to determine whether each connection pair is valid and, for each valid connection pair, a number of matching functions, wherein each connection pair identifies a first function of the first call stack and a second function of the second call stack;

select a first connection pair that is valid and has a largest number of matching functions of the valid connection pairs; and bridge the trace gap of the execution trace using the first connection pair.

20. The one or more non-transitory, computer-readable storage media of claim 19, wherein to evaluate the potential connection pairs comprises to:

determine whether the first function of a connection pair and the second function of the connection pair correspond to the same source function of the program; and increment the number of matching functions for the connection pair in response to determining that the first function and the second function correspond to the same source function.

21. The one or more non-transitory, computer-readable storage media of claim 20, wherein to evaluate the potential connection pairs further comprises to:

recursively determine whether a first caller of the first function and a second caller of the second function correspond to the same source function of the program; and increment the number of matching functions for the connection pair in response to determining that the first caller and the second caller correspond to the same source function.

22. The one or more non-transitory, computer-readable storage media of claim 19, wherein to bridge the trace gap comprises to:

connect the first function of the first connection pair to the second function of the first connection pair; and recursively connect a first caller of the first function to a second caller of the second function.

23. The one or more non-transitory, computer-readable storage media of claim 22, wherein to bridge the trace gap further comprises to:

determine whether the first function or the second function has no real caller;

associate the first function with a caller of the second function in response to determining that the first function has no real caller; and associate the second function with a caller of the first function in response to determining that the second function has no real caller;

wherein to recursively connect the first caller to the second caller comprises to recursively connect the first caller to the second caller in response to associating the first function with the caller of the second function or associating the second function with the caller of the first function.

24. The one or more non-transitory, computer-readable storage media of claim 19, further comprising a plurality of instructions that in response to being executed cause the computing device to trace execution of the program to generate the execution trace.

25. The one or more non-transitory, computer-readable storage media of claim 24, further comprising a plurality of instructions that in response to being executed cause the computing device to identify the trace gap in the execution trace of the program in response to tracing the execution of the program.

* * * * *